(12) United States Patent
Schill

(10) Patent No.: US 6,485,214 B2
(45) Date of Patent: *Nov. 26, 2002

(54) COUPLING DEVICE

(75) Inventor: Albrecht Paul Schill, Stockholm (SE)

(73) Assignee: System 3R International AB, Vallingby (SE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/339,829

(22) Filed: Jun. 25, 1999

(65) Prior Publication Data

US 2001/0048842 A1 Dec. 6, 2001

(30) Foreign Application Priority Data

Jul. 4, 1998 (DE) ........................... 198 29 955.9

(51) Int. Cl.[7] ............... B23Q 3/00; F16B 7/00; B25J 17/02
(52) U.S. Cl. ............ 403/13; 403/322.1; 403/322.2; 403/14; 403/15; 269/309
(58) Field of Search .................. 403/13, 14, 345, 403/361, 307, 300, 299, 303, 315, 316, 317, 320, 322.2, 322.1; 411/166, 427, 437, 327, 399; 269/309

(56) References Cited

U.S. PATENT DOCUMENTS

| | | | | | |
|---|---|---|---|---|---|
| 2,403,541 A | * | 7/1946 | Molat | .......................... | 411/537 |
| 3,693,484 A | * | 9/1972 | Snaderson, Jr. | ......... | 403/328 X |
| 3,741,573 A | * | 6/1973 | Treer | .......................... | 279/81 |
| 4,169,630 A | * | 10/1979 | Wagner | .................... | 411/176 |
| 4,577,847 A | * | 3/1986 | Obrist et al. | ................. | 269/309 |
| 4,636,135 A | * | 1/1987 | Bancon | .................. | 403/322 X |
| 4,645,173 A | * | 2/1987 | Geiger | ........................ | 248/680 |
| 4,676,142 A | * | 6/1987 | McCormick et al. | ..... | 901/29 X |
| 4,830,557 A | * | 5/1989 | Harris et al. | ............. | 411/537 X |
| 4,855,558 A | * | 8/1989 | Ramsbro | ................. | 219/69.15 |
| 4,906,123 A | * | 3/1990 | Weskamp et al. | .......... | 403/322 |
| 5,184,810 A | * | 2/1993 | Lebrecht | ..................... | 269/309 |
| 5,326,206 A | * | 7/1994 | Moore | ..................... | 411/537 X |
| 5,415,384 A | * | 5/1995 | Obrist et al. | ................. | 269/309 |
| 5,791,803 A | * | 8/1998 | Nordquist | .................... | 403/13 |
| 5,918,870 A | * | 7/1999 | Stark | .......................... | 269/309 |
| 5,961,261 A | * | 10/1999 | Stark | ..................... | 269/309 X |
| 6,073,325 A | * | 6/2000 | Stark | ..................... | 269/309 X |
| 6,139,002 A | * | 10/2000 | Stark | .......................... | 269/309 |
| 6,145,824 A | * | 11/2000 | Stark | .......................... | 269/309 |
| 6,160,236 A | * | 12/2000 | Nordquist | ............. | 279/4.06 X |
| 6,161,826 A | * | 12/2000 | Forrer | ........................ | 269/309 |
| 6,170,836 B1 | * | 1/2001 | Etter | ........................ | 279/4.06 |

FOREIGN PATENT DOCUMENTS

| | | | |
|---|---|---|---|
| DE | 2646951 | * | 4/1978 |
| DE | 3025157 A1 | * | 1/1982 |
| DE | 4135418 A1 | * | 5/1993 |
| EP | 255042 | | 2/1988 |
| EP | 722809 | | 7/1996 |
| FR | 2076132 A | * | 10/1971 |
| GB | 495976 | * | 11/1938 |
| IT | 618809 | * | 3/1961 |
| RU | 666313 | * | 6/1979 ................. 411/537 |

* cited by examiner

Primary Examiner—Lynne H. Browne
Assistant Examiner—Ernesto Garcia
(74) Attorney, Agent, or Firm—Jacobson Holman PLLC

(57) ABSTRACT

A coupling device with two coupling members, which are to be connected coaxially together, and a tension rod, which penetrates the first coupling member and is to be coupled with the second coupling member. To minimize the effect of the cross forces on the positioning of the second coupling member, it is provided that the end, facing the head of the tension rod, penetrates into a passage borehole of the second coupling member with a radial clearance; and a connector, resting against a shoulder of the second coupling member, can be attached to the end, thus resulting in radial clearance between connector and second coupling member. Furthermore, a connector is described whose periphery has a contour, which prevents a turning action inside the coupling member, whereby the connector can also be moved in the coupling member and exhibits an axial contact surface, which is adequately small to enable a swivelling motion without generating a counteracting moment of flexion.

13 Claims, 5 Drawing Sheets

COUPLING DEVICE

The invention relates to a coupling device with two coupling members, which are to be connected coaxially together, and a tension rod, which can be inserted into clamping elements, connected to the first coupling member, and which can be coupled to the second coupling member, which exhibits an axial passage borehole.

In the coupling device, disclosed in the document EP-A-255042 (U.S. Pat. No. 4,855,558), the end of the tension rod that is opposite the head can be coupled to the second coupling member by means of a bayonet locking mechanism. Furthermore, there are clamping elements, which act on the head of the coupling member relative to the first coupling member in order to stay the two coupling elements. In another case, where the second coupling member exhibits very little space to form the bayonet locking mechanism, the entire end of the tension rod can be tightly screwed together with the second coupling member in that a thread, formed on the end, engages with a counter thread, provided on the second coupling member.

The aforementioned coupling devices are mounted on the machining head of a machine tool, thus for example a lathe or an erosion machine, and serve to clamp a workpiece to be machined in a position at the machining head that is clearly defined spatially. The second coupling member can be either the workpiece itself or a workpiece holder, to which the workpiece is attached. Aligning passage boreholes through the tension rod and the second coupling member serve to guide the rinse fluid to the machining station.

The clamping elements are normally housed in the machining head, to which the first coupling member is permanently connected, and envelop in most cases a ball lock, whose balls, which can be moved radially to a limited degree and are distributed in the circumferential direction, engage radially, following the insertion of the tension rod, with the head of the machining head.

When the second coupling element is axially clamped to the first, cross forces are generated that become a noticeable disturbing factor when an attempt is made to obtain a positioning accuracy in an order of magnitude of one $\mu$m or less, especially when the axial length of the tension rod is relatively short and, therefore, there is inadequate space for the bayonet locking mechanism.

Therefore, the invention provides members of solving on the problem for the aforementioned coupling device that will minimize the effect of the cross forces on the positioning of the second coupling member.

The invention also provides that for the purpose of reaching through the second coupling member the tension rod exhibits a shaft, whose diameter is less than the clear width of the passage borehole and whose end is radially expanded by more than the clear width. This avoids the disturbing effect on the axial and angular positioning of the second coupling member caused by, for example, cross forces, generated by the clamping elements. For example, the radial clearance allows the tension rod to deflect a little sideways from the center axis (Z axis) so that the cross forces, causing this deflection, will have no effect on the clamping process.

It has been found advantageous for the passage borehole to be enlarged by boring, thus forming an annular shoulder, in order to receive the expanded end of the tension rod. Furthermore, it is expedient for the expanded end to be designed as a separate stopper, which is connected, e.g. can be screwed, to the shaft.

Even though it is sufficient for the purpose of the invention that the annular shoulder of the second coupling member and the related contact surface on the stopper extend at right angles to the center axis, it is possible for the stopper to rest with its entire surface against the shoulder if in an improvement of the invention both the annular shoulder and the contact surface are shaped like an arch or a crown, whereby the center of curvature of the convexity of both surfaces lies on the center axis outside the tension rod.

In an especially expedient embodiment of the invention both the peripheral surface of the stopper and the opposite internal contour of the enlarged boring exhibit the same noncircularity, thus guaranteeing that there will be no torsional strain between the stopper and the second coupling element.

Furthermore, it is recommended to insert between the head of the tension rod and its end a sleeve, penetrated by the shaft with a radial clearance. Thus the guiding of the tension rod into the clamping elements is improved. If the sleeve is provided with a radial ring seal, it also serves to cut off the pressure medium, actuating the clamping elements. Furthermore, it is recommended to provide on the free front face of the sleeve at least one axially extending shaped part, for example along the line of a protruding nose or a groove-shaped depression, which finds its counter-shaped part in the free front face of the second coupling member and guarantees that the second coupling member will rest against the sleeve so as not to rotate.

To guarantee the radial motion of the tension rod relative to the second coupling member, in particular when an electrode is attached to the second coupling member, it is also recommended in an improvement of the invention that the electrode-sided opening of the passage borehole be closed at least temporarily by means of a cover, which can be locked expediently into a depression in the second coupling member.

Preferred embodiments of the invention are disclosed in the dependent claims.

The invention is explained in detail below with the aid of the embodiments, depicted in the attached drawings.

Figure 6:
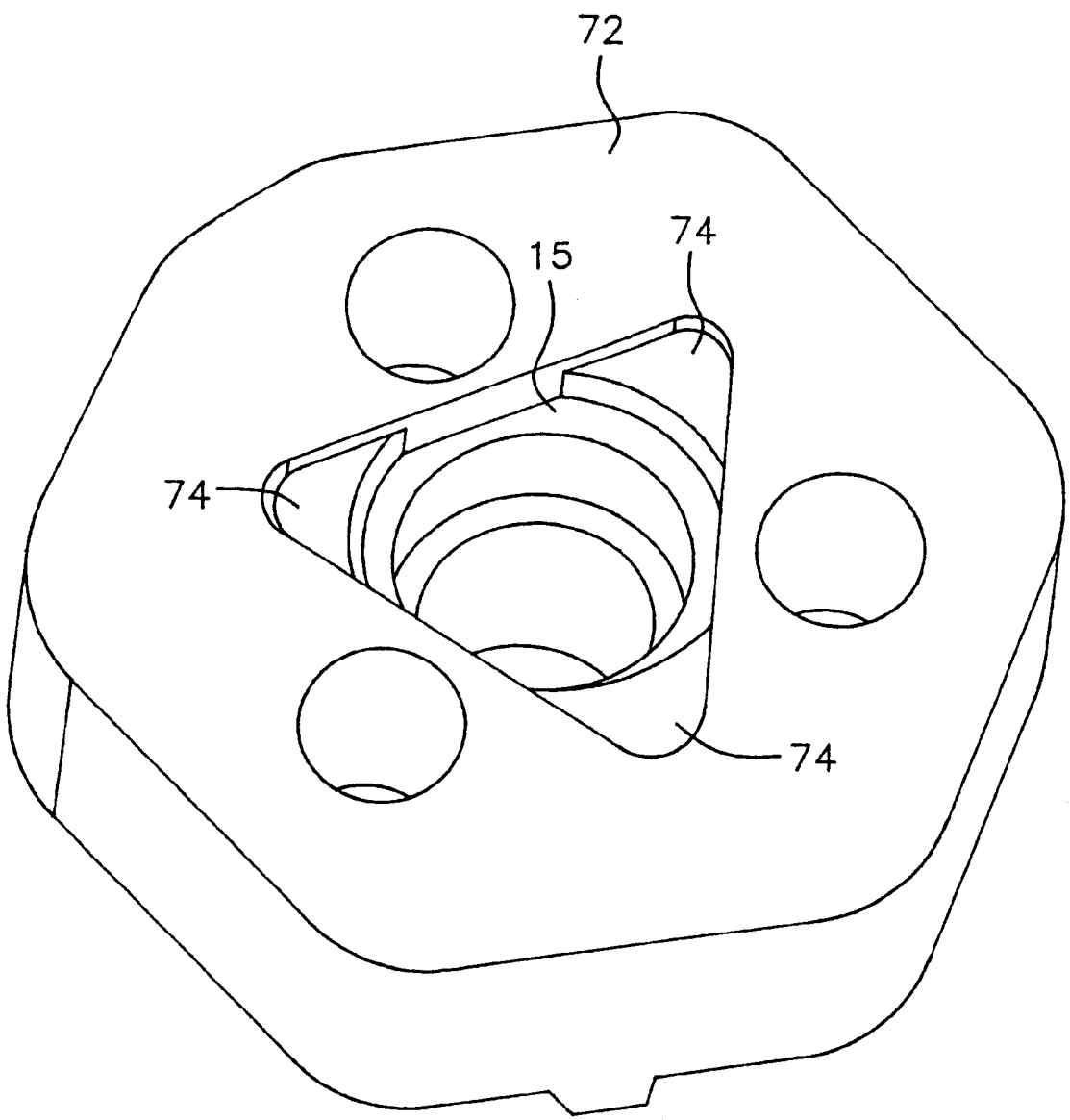
FIG. 6 is a diagrammatic perspective view of another modification of the second coupling member.

The coupling device is described below in conjunction with the machining head 30 of an erosion machine (not illustrated), even though the coupling device, which is claimed and described below, can also be used for other machine tools. The basic construction and the operating mode of the machining head 30 are described in the document EP-A-0255042 (U.S. Pat. No. 4,855,558), in particular in FIG. 6 with the related description, so that reference can be made explicitly to this document.

In this respect the machining head 30 comprises an upper pot-shaped housing member 18, into which a central pipe piece 32 is inserted and is held by a plate 34, screwed to the upper housing member 18. Housing member 18 and plate 34 enclose an annular chamber around the pipe piece 32, in which an annular piston 36 can be slid axially by means of several springs 38, braced against the plate (only one spring is shown). The housing member 18 and the plate 34 penetrate compressed air channels 31, 33, which open into the annular chamber and which cause the annular piston 36 to move against the effect of the spring 38 after said channels have been loaded with compressed air, coming from an exterior source of compressed air (riot illustrated). The channels also fulfill other functions. The surface of the annular piston 36, facing the pipe piece 32, exhibits an axially tapered radial recess 35, into which the balls of a ball lock can penetrate in accordance with the appropriate positioning of the annular piston 36. The balls 4, 37 of the ball lock are depicted. The balls, which are uniformly distributed in the circumferential direction, can be moved radially in the break-throughs of the pipe piece 32, whose shape prevents the balls 4, 37 from issuing beyond a specific amount into the inner channel of the pipe piece 32. The inner channel of the pipe piece 32 that is open at the top and the bottom aligns with an axial center borehole 39 of the housing member 18 and has a center line 24, which forms the Z axis for the purpose of positioning the second coupling member relative to the first coupling member.

To the bottom exterior side of the plate 34 is attached a first coupling member 40, which bears several spacing columns (of which the spacing columns 42, 44 are shown), which protrude toward the bottom and are uniformly distributed in the circumferential direction. The first coupling member 40 exhibits radially inside the spacing columns 42, 44 the reference elements 17, 27, for whose design reference is made to one example in the document EP-A-722809 (U.S. Pat. 5,791,803), FIG. 1, where the reference elements 17, 27, cited here, bear there the reference numerals 19, 10. The reference elements 17, 27 encircle the central opening of the pipe piece 32.

Figure 1:
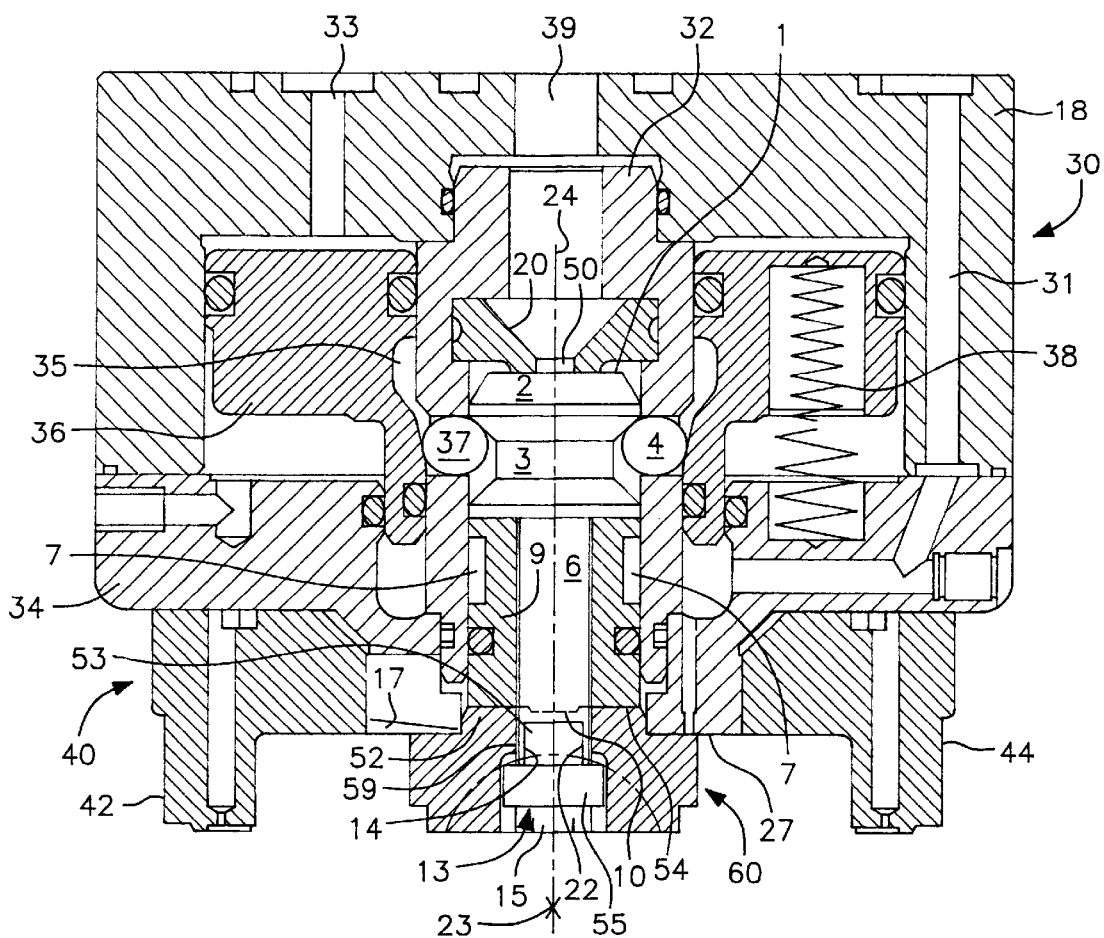
FIG. 1 is an axial view of a coupling device, equipped with the features of the invention, with a clamped second coupling member.

A tension rod, all of which is labeled 50, exhibits a head 2, to which is attached a shaft 6, whose end is provided with an internal thread. The section of the shaft 6 that attaches to the head 2 is surrounded by a sleeve 9. The head 2 and the shaft 6 comprise one piece, and the upper free front face 1 of the head 2 rests against a sealing element 20, which is arranged in a radial expansion of the aforementioned inner channel and exhibits a central opening. The figures do not show an axial passage borehole of the tension rod 50, which aligns with the opening in the sealing element 20 and serves to guide the rinse fluid, flowing in through the opening 39. The head 2 exhibits a double conical indent 3, which is, as shown in FIG. 1, on a level with the ball lock, when the tension rod 50 is inserted into the inner channel of the pipe piece 32 and when the front face 1 rests against the sealing element 20. If the annular piston 36 is, according to FIG. 1, in the vicinity of this upper end position, the balls 4, 37 of the ball lock are forced into the indent 3 and thus hold the tension rod 50 securely in the axial direction.

The radial outer dimension of the sleeve 9 does not project beyond that of the head 2. The periphery of the sleeve 9 exhibits opposing flats 7, which enable the tension rod 50 to hang, for example, with the second coupling member 60, which is attached to the said rod, in a tool magazine, whereby grippers of the magazine engage with the flats 7. Moreover, the sleeve 9 rests against the inner surface of the inner channel and seals it toward the outside with a ring seal 19. The outer dimension of the shaft 6 is somewhat less than the clear width of the sleeve 9 so that radial clearance remains between shaft 6 and sleeve 9. The free end of the shaft 6 bears an inner thread, into which is screwed the throat 53 of an axially bored stopper 13, said throat being provided with an outer thread. The upper contact surface 22 of the stopper head 55, which is expanded relative to the throat 53, reaches under an annular shoulder 14, which is formed by means of a bottom radially enlarged boring 15 of an axial passage borehole 59 of the second coupling member 60.

The top side of the second coupling member 60 is provided first with counter reference elements (not shown), which are similar to the counter reference elements 44, 58 in the patent EP-A-722809 (U.S. Pat. No. 5,791,803). The second coupling member 60 has a central prominent extension 52, whose essentially planar front surface 54 rests with its surface against the bottom side of the sleeve 9 that is also essentially planar. The top side of the sleeve 9 rests against the bottom side of the head 2.

Figure 2:
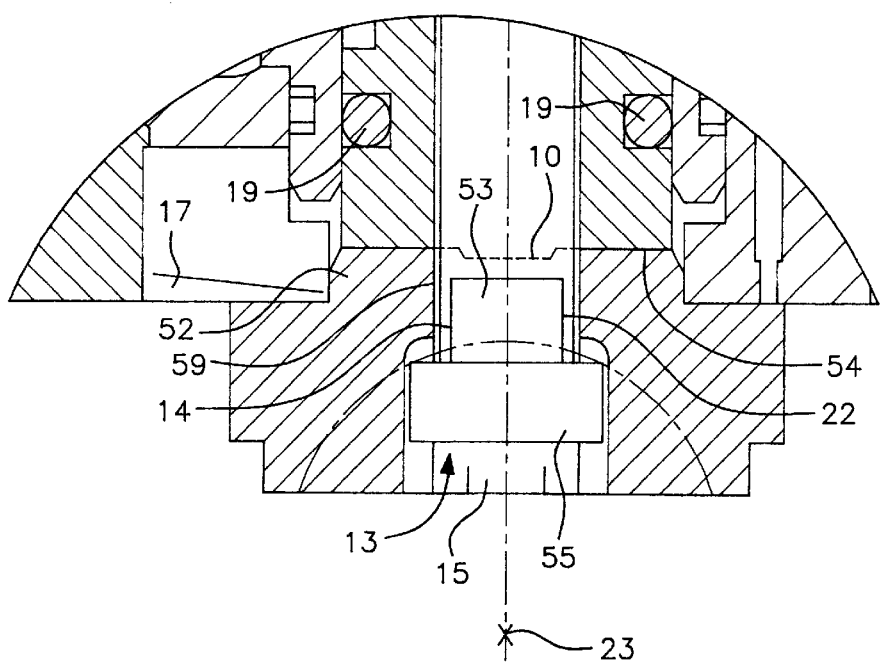
FIG. 2 shows an enlargement of a detail of the device, according to FIG. 1.

As illustrated with the dashed line in FIG. 2, the front surface 54 exhibits an axial profiling in the shape of a depression, with which a suitably shaped nose 10, protruding from the bottom side of the sleeve 9, engages. That is, the nose 10 extends in an axial direction but is offset from the axis. Therefore, in the illustrated connection between the second coupling member 60 and the tension rod 50 the second coupling member 60 cannot rotate relative to the tension rod 50.

Figure 3:
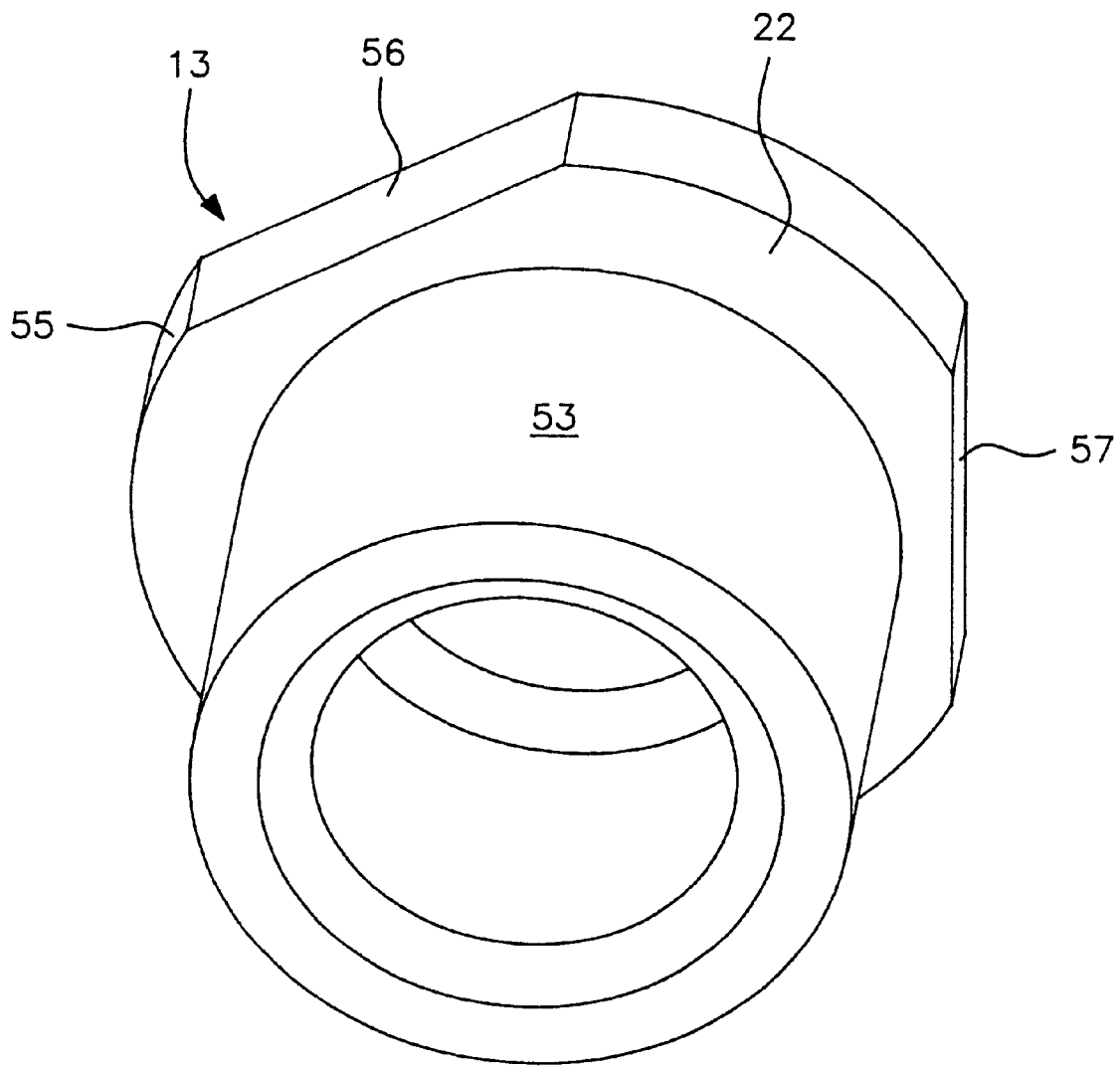
FIG. 3 is a perspective view of a stopper from the top.
Figure 4:
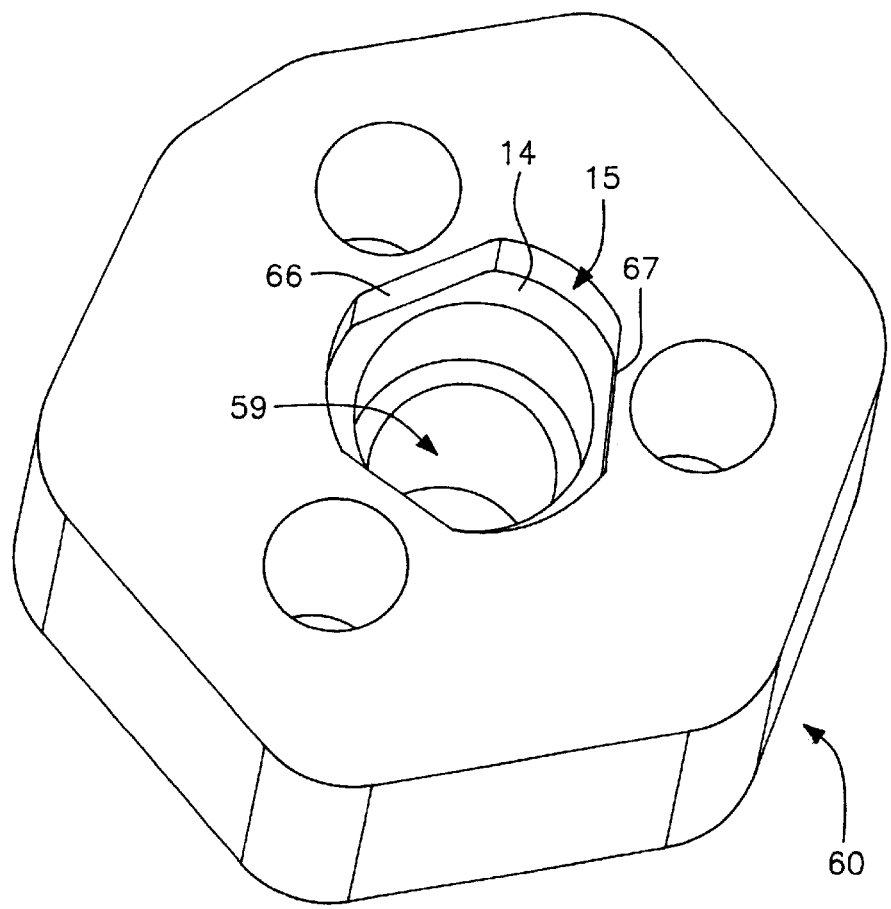
FIG. 4 is a perspective view of the second coupling member from the bottom.

The stopper head 55 is not round in the circumferential direction, and the enlarged boring 15 is also shaped correspondingly non circular in its bottom section, receiving the stopper head 55. In the illustrated embodiment the circumference of the stopper head 55, which is expanded radially relative to the cylindrical throat 53, exhibits flats 56, 57, which match the corresponding flats 66, 67 on the inner surface of the enlarged boring 15 (FIGS. 3, 4). On the whole, the radial stretch of the stopper head 55 is smaller than the enlarged boring 15 of the passage borehole 59 in the second coupling member 60 so that the stopper 13 can be moved radially inside the enlarged boring 15 of the second coupling member 60.

When the two coupling members are coupled, the second coupling member 60 with its counter reference elements is secured relative to the reference elements 17, 27 of the first coupling member 40 with a holding force that comprises the pressure force of the spring 38 and is optionally supported by the compressed air by means of the balls 4, 37, reaching under the head 3. When the balls 4, 37 of the ball lock reach under the head 3 in such a manner that the center of the effect of its force is on the axis 24, only an axial tension is exerted on the tension rod 50, said tension being transferred directly to the second coupling member 60.

However, it often happens that the center of the effect of the force on the tension rod 50 that issues from the balls 4, 37 of the ball lock is not on, but rather next to the axis 24. In this case the head 2 is tilted or slid a little toward the center line 24 with the result that, if the radial clearance were not present, a component of force that is at right angles to the axis 24 would be exerted on the second coupling member 60, in addition to the axial component of the tension. This cross component can vary from machining head to machining head and effect the axial and angular positioning of the second coupling member 60 relative to the first coupling member 40, especially when the second coupling member 60 is relatively small in the radial direction and the overall length of the tension rod 50 is relatively short, as illustrated. Therefore, the envisaged radial clearance guarantees the possibility of tilting, as desired, the head 2 with shaft 6 and stopper 13 inside the sleeve 9 and the passage borehole 59 and the enlarged boring 15. When the plane of the annular shoulder 14 and the annular surface 22 extend at right angles to the axis 24, the said conditions result in both surfaces no longer resting planarly, but rather only region-by-region.

A planar resting of the annular surface 22 against the annular shoulder 14 is guaranteed, according to one special feature of the invention, when the head 2 is moved crosswise relative to the axis 24, only when both the annular shoulder 14 and the annular surface 22 are spherical, i.e. arched, with the result that the convexity's common center 23 of curvature is outside the tension rod and the second coupling member 60. The convexity corresponds to a concave shape of the surfaces 14, 22. When these surfaces are shaped in this manner, a flat contact and thus uniform distribution of the tension is obtained, even if the center of the effect of the force of the ball lock 4, 37 on the head 2 of the tension rod should be displaced laterally outside the axis 24.

Figure 5:
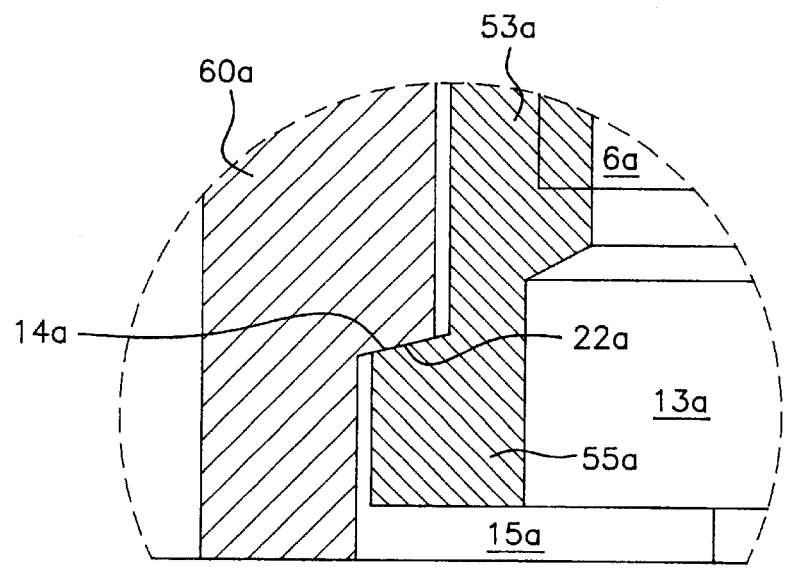
FIG. 5 shows an enlargement of a detail, similar to FIG. 2, of a modification of the device, according to FIG. 1.

FIG. 5 shows an embodiment, where the annular shoulder 14a of the second coupling member 60a and the annular surface 22a of the stopper 13a exhibit an oblique shape toward the outside and to the bottom and are, moreover, flat. Furthermore, one can clearly recognize in FIG. 5 the radial clearance between the throat 53a and the shaft 6a, on the one hand, and the second coupling member 60a, on the other hand. Furthermore, one can also see the radial clearance between the stopper head 55a and the side wall of the enlarged boring 15a. At variance with the embodiment described above, there is also the condition that the throat 53a exhibits an inner thread, which engages with the respective outer thread at the end of the shaft 6a.

Figure 7:
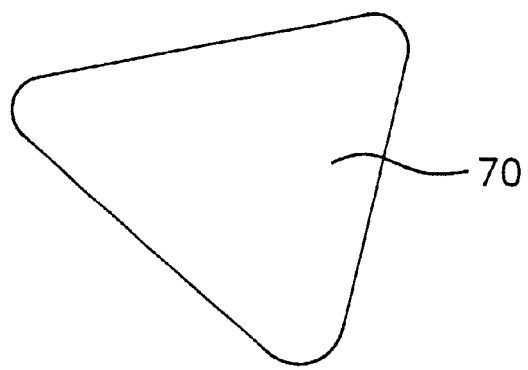
FIG. 7 is a view of a cover.
Figure 8:
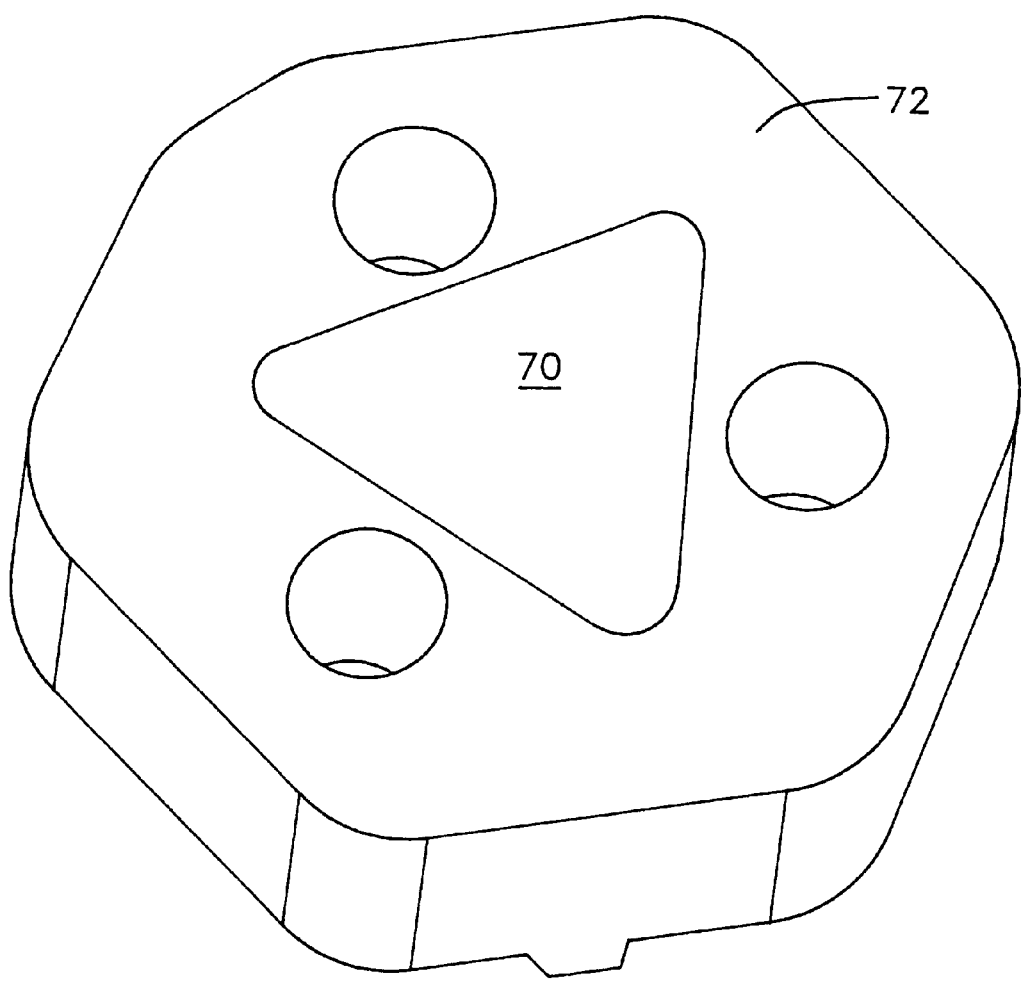
FIG. 8 is a diagrammatic perspective view of the covered second coupling member, according to FIG. 6.

To guarantee the radial motion of the tension rod 50 subject to cross forces generated by tightening, an improvement of the invention for the enlarged boring 15 provides a cover 70 (FIG. 7), which has here an essentially triangular shape. Correspondingly the underside 72 of the second coupling member 60 around the enlarged boring 15 exhibits a depression 74, whose profile and depth is adapted to the dimensions of the cover 70. The cover 70 can be forced into the depression 74 so as to jam, thus closing the enlarged boring 15 against soiling, a state that can occur during the cementing or welding of electrodes to the underside 72 of the second coupling member 60. As evident from FIGS. 1, 2 and 5, the stopper head 55 or 55a is smaller in the axial direction than the respective axial dimension of the enlarged boring 15, 15a. Therefore, the cover 70, forced into the depression 74, also covers simultaneously the stopper 13, 13a. As also evident from FIGS. 6 and 8, the depression 74 and thus the cover 70 leave enough room on the underside 72 of the second coupling member to attach the electrodes, which are not depicted here. The cover 70 can be liberated from its force fit in the depression 74 by pushing on the tension rod 50 from the top and then be conveyed to the outside through the hollow electrode.

If the electrode is made of solid material, a central passage borehole is made through it and the cover 70 after the electrode is cemented or welded to the free underside 72, in order to enable rinse fluids to pass through. It is also conceivable that the cover 70 already has beforehand a suitable central opening.

What is claimed is:

1. A coupling device, in combination with first and second coupling members, for coaxially coupling the first coupling member to the second coupling member, said device including a tension rod having an axially-extending tension rod head of circular cross-section and an elongated tension rod shaft extending axially therefrom, said tension rod insertable within an axially oriented channel of circular cross-section and within said first coupling member, and releasably maintainable within said channel by clamping elements engaging said tension rod head; said clamping elements being within said first coupling member for engaging said tension rod head and clamping said tension rod to said first coupling member, a sleeve surrounding said tension rod shaft, said sleeve having a cylindrical sleeve bore providing a radial clearance between said tension rod shaft and said sleeve, said sleeve having an outer wall with a circular cross-section portion substantially equal to the circular cross-sectional diameter of said axially-oriented channel within said first coupling member, said tension rod shaft having a tension rod shaft coupling means for coupling the tension rod shaft to a shaft end piece, a shaft end piece connectable with said coupling means and having an end portion diameter greater than the tension rod shaft diameter, said tension rod shaft extending through a passage borehole within said second coupling member, said passage borehole having a first passage borehole section with a diameter greater than the tension rod shaft diameter to provide a radial clearance between said tension rod shaft and said first passage borehole section, said first passage borehole diameter being less than said end portion diameter, wherein said passage borehole is radially expanded and extends axially to a free end of said second coupling member which defines a second passage borehole section, wherein said first and second passage borehole sections define an annular shoulder, said end portion of said shaft end piece having a contact surface engaging said annular shoulder to couple said second coupling member to said first coupling member.

2. The coupling device as claimed in claim 1, wherein said second coupling member, when maintained by said tension rod to said first coupling member, has a front surface in planar engagement against an underside of said sleeve.

3. The coupling device as claimed in claim 2, wherein said front surface of said second coupling member engages the underside of said sleeve by axially extending profiles to couple the second coupling member non-rotatably with respect to said sleeve.

4. A coupling device, in combination with first aid second coupling members, for coaxially coupling the first coupling member to the second coupling member, said device including a tension rod having an axially-extending tension rod head of circular cross-section and an elongated tension rod shaft extending axially therefrom, said tension rod insertable within an axially oriented channel of circular cross-section and said first coupling member and releasably maintainable within said channel by clamping elements engaging said tension rod head, said clamping elements being within said first coupling member for engaging said tension rod head and clamping said tension rod to said first coupling member, said tension rod shaft having a tension rod shaft coupling means for coupling the tension rod shaft to a shaft end piece, a shaft end piece connectable with said coupling means and having an end portion diameter greater than the tension rod shaft diameter, said shaft end piece comprising a separate stopper element connected to said coupling means of said tension rod shaft, said tension rod shaft extending through a passage borehole within said second coupling member, said passage borehole having a first passage borehole section with a diameter greater than the tension rod shaft diameter to provide a radial clearance between said tension rod shaft and said first passage borehole section, said first passage borehole diameter being less than said end portion diameter, wherein said passage borehole is radially expanded and extends axially to a free end of said second coupling member which defines a second passage borehole section, wherein said first and second passage borehole sections define an annular shoulder said end portion of said shaft end piece having a contact surface engaging said annular shoulder to couple said second coupling member to said first coupling member, wherein said second passage borehole section is noncircular in the circumferential direction and wherein said stopper element includes a stopper head correspondingly noncircular to provide a substantially twist-proof coupling between said stopper element and said second coupling member.

5. The coupling device as claimed in claim 4 wherein noncircular is defined by lateral flats at the stopper element and at the second coupling member.

6. A coupling device, in combination with first and second coupling members, for coaxially coupling the first coupling member to the second coupling member, said device including a tension rod having an axially-extending tension rod head of circular cross-section and an elongated tension rod shaft extending axially therefrom, said tension rod insertable within an axially oriented channel of circular cross-section and said first coupling, and releasably maintainable within said channel by clamping elements engaging said tension rod head; said clamping elements being within said first coupling member for engaging said tension rod head and clamping said tension rod to said first coupling member, said tension rod shaft having a tension rod shaft coupling means for coupling the tension rod shaft to a shaft end piece, a shaft end piece connectable with said coupling means and having an end portion diameter greater than the tension rod shaft diameter, said shaft end piece comprising a separate stopper element connected to said coupling means of said tension rod shaft, said tension rod shaft extending through a passage borehole within said second coupling member, said passage borehole having a first passage borehole section with a diameter greater than the tension rod shaft diameter to provide a radial clearance between said tension rod shaft and said first passage borehole section, said first passage borehole diameter being less than said end portion diameter, wherein said passage borehole is radially expanded and extends axially to a free end of said second coupling member which defines a second passage borehole section, wherein said first and second passage borehole sections define an annular shoulder, said end portion of said shaft end piece having a contact surface engaging said annular shoulder to couple said second coupling member to said first coupling member, wherein said stopper element has a contoured periphery for preventing turning action inside the second coupling member, said stopper element movable within the second coupling member and having an axial contact surface used to engage and swivel to the second coupling member without generating a counteracting moment of flexion, said stopper element has a noncircular periphery received in a correspondingly noncircular boring of the second coupling member with a radial clearance.

7. The coupling device of claim 6 wherein said noncircular periphery comprises suitable lateral flats at a head portion of said stopper element.

8. The coupling device as claimed in claim 7 wherein said stopper head portion has an axial contact surface and the second coupling member has an annular shoulder in contact therewith.

9. The coupling device as claimed in claim 8 wherein the plane of the annular shoulder and the plane of the contact surface extend at right angles to a major axis of said second coupling member.

10. The coupling device as claimed in claim 8 wherein the annular shoulder and the annular surface resting against said shoulder, are shaped convexly, whereby the center of curvature of the convexity lies on said major axis outside the tension rod and the second coupling member.

11. The coupling device as claimed in claim 8 wherein said annular shoulder is substantially planar and extends radially toward the outside and to the bottom of said second coupling member.

12. A coupling device, in combination with first and second coupling members, for coaxially coupling the first coupling member to the second coupling member, said device including a tension rod having an axially-extending tension rod head of circular cross-section and an elongated tension rod shaft extending axially therefrom, said tension rod shaft having a tension rod shalt diameter which is less then a cross-sectional diameter of said tension rod head, said tension rod insertable within an axially oriented channel of circular cross-section and said first coupling member, and releasably maintainable within said channel by clamping elements engaging said tension rod head; said clamping elements being within said first coupling member for engaging said tension rod head and clamping said tension rod to said first coupling member, said tension rod shaft having a tension rod shaft coupling means for coupling the tension rod shaft to a shaft end piece, a shaft end piece connectable with said coupling means and having an end portion diameter greater than the tension rod shalt diameter, said tension rod shaft extending through a passage borehole within said second coupling member, said passage borehole having a first passage borehole section with a diameter greater than the tension rod shaft diameter to provide a radial clearance between said tension rod shaft and said first passage borehole section, said first passage borehole diameter being less than the said end portion diameter, wherein said passage borehole is radially expanded and extends axially to a free end of said second coupling member which defines a second passage borehole section, wherein said first and second passage borehole sections define an annular shoulder, said end portion of said shaft end piece having a contact surface engaging said annular shoulder to couple said second coupling member to said first coupling member, and wherein the tension rod shaft is surrounded by a sleeve which may be coupled nonrotably to the second coupling member and which is adapted to be gripped by a gripper of a tool magazine.

13. A coupling device in combination with first and second coupling members for coaxially coupling the first coupling member to the second coupling member, including a tension rod insertable between clamping elements connected with said first coupling member for clamping the tension rod to the first coupling member, said tension rod including a tension rod shaft having a tension rod shaft diameter with an enlarged shaft end having a shaft end diameter greater than the tension rod shaft diameter, wherein said enlarged shaft end is a separate stopper element connectable to said tension rod shaft, said tension rod shaft extending through a passage borehole within said second coupling member, said passage borehole having a passage borehole section with a borehole diameter greater than the tension rod shaft diameter to provide a radial clearance between said tension rod shaft and said passage borehole section, said borehole diameter being less than the shaft end diameter, wherein said tension rod couples said second coupling member to said first coupling member wherein said passage borehole section is noncircular in the circumferential direction and wherein said separate stopper element includes a stopper head correspondingly noncircular to provide a substantially twist-proof coupling between said separate stopper element and said second coupling member.

* * * * *